UNITED STATES PATENT OFFICE.

WILLIAM MORRISON, OF DES MOINES, IOWA.

BINDER FOR PEROXID ACTIVE MATERIAL AND PROCESS OF MAKING IT.

1,021,990. Specification of Letters Patent. Patented Apr. 2, 1912.

No Drawing. Application filed February 20, 1912. Serial No. 678,771.

*To all whom it may concern:*

Be it known that I, WILLIAM MORRISON, a citizen of the United States, residing at Des Moines, in the county of Polk and State of Iowa, have invented certain new and useful Improvements in Binders for Peroxid Active Material and Processes of Making Them, of which the following is a specification.

This invention relates to the production of a permanent and insoluble binder for the active material of the positive-pole electrodes of lead storage batteries. This binder fundamentally comprises an oxygen-compound of a metal incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electronegative elements, which can constitute the acidic radical of compounds having lead as a base. The three known metals which have these characteristics are tungsten, tantalum, and niobium, otherwise called columbium.

To illustrate the invention, there will first be described an electrolytic process of producing a lead-peroxid electrode employing a compound of tungsten as the binder. For this purpose, a metallic support, for example a grid of antimonial lead, is pasted or filled with the usual mixture of minium, litharge and a sulfuric acid solution, in which mixture lead sulfate forms as a provisional binder. Complete formation, or peroxidation, of the active material is then preferably initially effected by placing the pasted grids, alternately with unfilled grids serving as dummy electrodes of the opposite polarity, in a sulfuric acid solution having a specific gravity of 1.200 to 1.250 and passing an electric current through the solution, alternately in opposite directions, until the paste has been sufficiently expanded, care being taken not to force the discharge beyond the normal intended capacity of the electrodes. The formed and dummy electrodes are then removed from the sulfuric acid solution and placed in a cell containing water, and electric current is passed from the filled electrodes to the dummies until the free acid in the active material has been removed. The electrodes and dummies are then removed, rinsed in water, and placed in a strong aqueous solution of an alkali-metal tungstate, for example sodium paratungstate. An electric current is then passed from the filled electrodes through the solution to the dummies, and is continued for several hours, thereby causing tungsten ions, presumably complex tungsten-oxygen ions, to penetrate the active material to any desired degree and to combine chemically with the lead-oxygen compounds thereof, and particularly with the lead sulfate which serves as the provisional binder in the electrode. The electrodes and dummies are then removed, rinsed in water, placed in a sulfuric acid solution having a specific gravity of about 1.300, and an electric current is passed from the electrodes to the dummies until all of the soluble constituents of the active material have been removed or rendered insoluble. By this treatment any hydrated tungstic salt is converted into the insoluble or non-hydrous condition. It is in this insoluble state that the tungsten compound serves as an efficient and inert binder. The electrodes are then discharged to the extent of their normal capacity, and thereafter recharged, preferably to somewhat less than their full capacity, in another sulfuric acid solution of 1.280 specific gravity, the effect of such incomplete recharging being to leave in the plate a certain proportion of lead sulfate to combine with the tungsten ions on a repetition of the treatment, should such repetition be desired, for the purpose of impregnating the active material with an additional amount of the binder compound. At the conclusion of the treatment the positive-pole electrodes are mounted in connection with the regular negative plates, and receive their full normal charge.

The object of performing the preceding operations with dummy electrodes instead of with the regular battery electrodes is to prevent injury to the latter by combination of tungsten therewith or by deposition of impurities therein. Positive-pole electrodes prepared as described are not suited for forming negative electrodes by reversal, since negative electrodes thus formed undergo discharge by local action.

The tungsten-oxygen anion appears to play the same rôle in the binder compound as does the sulfur-oxygen anion in the ordinary lead electrodes in which lead sulfate constitutes the binder. The lead-tungsten-oxygen compound is however, as compared with the lead sulfate heretofore commonly used as a binder, very permanent and insoluble, being chemically and electrochemically inert under the conditions of use, while acting as an efficient binder. This binder, by reason of its inactivity, somewhat decreases the capacity of the electrodes, to the same extent that it displaces or occupies the place of lead peroxid. The initial formation of the electrodes may be omitted and the filled grids may be at once placed in the tungstate solution to impregnate the active material with the binder, formation being subsequently effected. Such subsequent formation, however, consumes a much larger amount of current than does initial formation.

While the described electrolytic process of impregnation is an efficient and operative one, it is sometimes preferable, particularly with thick plates, in order uniformly to distribute the binder throughout the active mass, to incorporate a portion of the binder with the active material by other methods, two of which will now be described. The first of these optional methods consists in forming an aqueous solution of a suitable lead salt, as lead nitrate or acetate, adding sodium paratungstate until all the lead is precipitated, separating the precipitate and washing it with dilute sulfuric acid, then boiling it in strong sulfuric acid, washing it with water, and heating it nearly or quite to its melting point, in order to give it a denser body. The desired proportion of this product, say from six to ten per cent. or more, is very thoroughly mixed with the minium-litharge paste, as by grinding the materials together. The active material so prepared is then applied to the grid. The second of these optional methods consists in dissolving the desired amount of sodium paratungstate in a ten volume aqueous solution of hydrogen peroxid, that is to say a solution capable of liberating ten volumes of oxygen, and then adding slowly and with constant stirring a sulfuric acid solution having a specific gravity of 1.200 to 1.225 until effervescence ceases. There is then added an additional and preferably an equal amount of said sulfuric acid solution, and the formed positive electrode is dipped in the solution, then removed and permitted to dry with exposure to air, and again dipped and dried one or more times as may be desired.

One effect of the hydrogen peroxid as above used is to prevent precipitation of tungstic acid upon the addition of the sulfuric acid; and if any tendency to such precipitation is observed, more hydrogen peroxid should be added until the solution remains clear. The hydrogen peroxid is used in some excess, and serves also in presence of the sulfuric acid to reduce the lead peroxid of the formed electrode, and thereby to facilitate the ultimate production of the lead-tungsten-oxygen binder. If stronger hydrogen peroxid solutions are used a correspondingly smaller volume will be required.

The positive-pole electrode prepared by either of the above described optional methods should receive a prolonged and strong charging treatment in sulfuric acid, with dummy negatives, before assembling in the battery, in order to remove or to render insoluble any remaining soluble components of the plate.

The foregoing methods may be used singly or in combination as desired, but if used in combination it is preferred to use the electrolytic method first above described as the finishing stage.

It is to be understood that the several foregoing examples are illustrative in character, and that the invention is not limited to the details of manipulation or to the strength or proportions of reagents recited; and it is also to be understood that the positive-pole electrodes may be prepared by methods other than those herein specifically described without departure from my invention.

Positive-pole electrodes having a binder containing tantalum or niobium may be prepared by either or both of the first and second methods above described, a soluble tantalate or niobate, as for example potassium hexa- tantalate or niobate, being used either as an electrolyte in the first method, or as a precipitant for the lead salt in accordance with the second method. The active material of Planté electrodes, formed out of solid lead, may also be bound by using either the first or third of the above-described methods, that is by employing them as anodes in a solution of a tungstate, tantalate or niobate, or by dipping them in a hydrogen peroxid solution of a salt of the binder-metal, and then completing the treatment as before.

I claim:

1. A permanent binder for the active material of positive-pole lead electrodes, consisting of a compound having in its acidic radical a metal incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electro-negative elements.

2. A permanent binder for the active material of positive-pole lead electrodes, consisting of a lead compound having in its acidic radical a metal incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electro-negative elements.

3. A permanent binder for the active material of positive-pole lead electrodes, consisting of an oxygen compound of lead and a metal incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electronegative elements.

4. A permanent binder for the active material of positive-pole lead electrodes, consisting of an oxygen-sulfur compound of lead and a metal incapable of directly replacing hydrogen in a sulfuric-acid solution; insoluble by anodic oxidation in a sulfuric acid solution; incapable of cathodic reduction to metal, or of electrolytic separation as metal, in a sulfuric acid solution; and capable of forming complex anions with electronegative elements.

5. A permanent binder for the active material of positive-pole lead electrodes, consisting of a compound having tungsten in its acidic radical.

6. A permanent binder for the active material of positive-pole lead electrodes, consisting of a lead compound having tungsten in its acidic radical.

7. A permanent binder for the active material of positive-pole lead electrodes, consisting of an oxygen compound of lead and tungsten.

8. A permanent binder for the active material of positive-pole lead electrodes, consisting of an oxygen-sulfur compound of lead and tungsten.

9. In a process of binding the active material of positive-pole lead electrodes, the step which consists in impregnating the active material with a compound containing in its acidic radical a metal incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electronegative elements.

10. In a process of binding the actice material of positive-pole lead electrodes, the step which consists in electrolytically impregnating the active material with a compound containing in its acidic radical a metal incapable of directly replacing hydrogen in a sulfuric acid solution; insoluble by anodic oxidation in a sulfuric acid solution; incapable of cathodic reduction to metal, or of electrolytic separation as metal, in a sulfuric acid solution; and capable of forming complex anions with electronegative elements.

11. In a process of binding the active material of positive-pole lead electrodes, the step which consists in impregnating the active material with a compound containing tungsten in its acidic radical.

12. In a process of binding the active material of positive-pole lead electrodes, the step which consists in electrolytically impregnating the active material with a compound containing tungsten in its acidic radical.

13. In a process of binding the active material of positive-pole lead electrodes, the step which consists in passing an electric current from the electrode through a solution of a tungstate, thereby impregnating the active material with a tungsten compound.

14. The process of binding the active material of positive-pole lead electrodes, which consists in passing an electric current from the electrode through a solution of a tungstate, thereby impregnating the active material with a tungsten compound, and thereafter reacting on said compound with sulfuric acid.

15. The process of binding the active material of positive-pole lead electrodes, which consists in passing an electric current from the electrode through a solution of a tungstate, thereby impregnating the active material with a tungsten compound, and thereafter electrochemically reacting on said compound with sulfuric acid.

16. The process of producing positive-pole lead electrodes having active material containing a permanent binder, which consists in dissolving a tungstate in a hydrogen peroxid solution, adding sulfuric acid, submerging the electrode in the solution, removing it and drying it, passing an electric current from the electrode, as anode, through a solution of a tungstate, thereby impregnating the active-material with a tungsten compound, and reacting on said compound with sulfuric acid.

In testimony whereof I affix my signature in presence of two witnesses.

WILLIAM MORRISON.

Witnesses:
EUGENE A. BYRNES,
ETHEL DANIELS.